2,947,792
Patented Aug. 2, 1960

2,947,792

STABILIZATION OF TETRACHLOROETHYLENE WITH A MIXTURE OF A HYDROXY ALKYNE AND ISOEUGENOL

Maxwell James Skeeters, Painesville, Ohio, assignor to Diamond Alkali Company, Cleveland, Ohio, a corporation of Delaware No Drawing. Filed Feb. 16, 1954, Ser. No. 410,735

3 Claims. (Cl. 260—652.5)

This invention relates to the stabilization of chlorohydrocarbons, particularly, low-molecular weight chlorohydrocarbons such as trichloroethylene and tetrachloroethylene (perchloroethylene), against decomposition under the influence of heat, moisture, light, air and metal surfaces. The invention is concerned particularly with stabilizing such compounds against decomposition as caused by exposure to light and with compositions including them and a special stabilizer the particular function of which is to inhibit light-catalyzed decomposition. Additionally, the invention relates to a composition comprising such chlorohydrocarbons, a general stabilizer functioning to inhibit decomposition especially against the effects of heat, moisture, air and metal surfaces, and the special light-stabilizer. The invention is concerned especially with the stabilization of tetrachloroethylene and compositions which include tetrachloroethylene. For convenience in describing the invention, reference will be made hereinafter only to tetrachloroethylene, except for an occasional reference to trichloroethylene, and it should be understood that wherever tetrachloroethylene is mentioned, other similar chlorohydrocarbons may be employed and that the invention extends to such similar chlorohydrocarbons.

It has been known heretofore that chlorohydrocarbons, for example, tetrachloroethylene, of a high degree of purity and containing only minute amounts of saturated, or other unsaturated, lower aliphatic chlorohydrocarbons is very inert to the action of air, light, heat, moisture, and metal surfaces with which it comes into contact during storage and commercial use. However, the obtaining of such high purity tetrachloroethylene in commercial production is not generally feasible and it has been found that the impure material normally encountered in commerce decomposes when in contact with the substances noted above. Hence, means other than purification for preventing or inhibiting the decomposition of tetrachloroethylene and the lower chlorinated aliphatic hydrocarbons generally associated therewith must be had. Trichloroethylene involves a very similar problem.

It is generally believed that tetrachloroethylene exposed to air, light, heat, moisture, etc., decomposes, especially in the presence of moisture, principally by way of oxidative attack at the double bond involving a series of steps in which the ultimate products include phosgene, trichloroacetic acid, and hydrogen chloride. It is also believed that the oxidative attack is catalyzed by light and by the products of oxidation, as a result of which, oxidative decomposition once initiated is self-catalyzing and self-sustaining. Other chlorohydrocarbons generally associated with crude commercial tetrachloroethylene also are subject to oxidative attack and decompose to some of the same products as those formed by the oxidation of tetrachloroethylene, and at a somewhat accelerated rate, as compared to the oxidation of tetrachloroethylene. These products are then available to catalyze the decomposition of the tetrachloroethylene. For example, tetrachloroethylene obtained commercially from the crude products of chlorination and chlorinolysis of lower aliphatic hydrocarbons may contain small but appreciable amounts of saturated and unsaturated chlorinated hydrocarbons, such as dichloroethylene, trichloroethylene, trichloroethane, unsymmetrical tetrachloroethane, pentachloroethane, and the like. These lower chloro-hydrocarbons in themselves are relatively innocuous in solvent extraction processes in which the tetrachloroethylene is used, but the oxidation decomposition products thereof corrode metal surfaces with which a body of tetrachloroethylene containing them comes into contact. These less stable chlorohydrocarbons are believed to be the principal initial source of chloro-oxygen-containing impurities, such as phosgene, chloroacetic acid, trichloroacetic acid, and the like, in the tetrachloroethylene, which impurities catalyze decomposition of the tetrachloroethylene. Generally speaking, the same may be said respecting trichloroethylene.

The problem, therefore, is principally one of inhibiting initiation of the oxidation of chlorohydrocarbons commonly associated with commercial tetrachloroethylene and similar compounds, as well as inhibiting the oxidation of tetrachloroethylene itself.

Accordingly, the primary object of the present invention is to provide means for inhibiting oxidation of low-molecular weight chlorohydrocarbons, especially tetrachloroethylene, and lower aliphatic chlorohydrocarbons generally associated therewith during exposure especially to light, and also to air, heat, moisture, and metal surfaces.

This and other objects will be apparent to those skilled in the art from the discussion hereinafter.

Tetrachloroethylene is a widely employed solvent and is used particularly in the dry cleaning of fabrics and in the degreasing of metals, such as, steel, aluminum and brass. These applications of the solvent expose it to the several decomposing effects, as a result of which, impurities as noted above form therein and create rather serious problems. In particular, fabrics cleaned with such contaminated solvent appear dull and lifeless, especially fabrics in pastel colors, and the odor of the residual solvent in the fabric and the cleaning plant becomes increasingly unpleasant. As applied in metal degreasing, such contaminated solvent corrodes the metal and discolors or stains it even where contamination is slight. Even some stabilized products produce adverse effects such as, for example, reduced cleaning efficiency, staining of metals such as brass and aluminum. Also, some stabilized compositions are not fully compatible with soaps and detergents.

It is known that tetrachloroethylene and trichloroethylene may be stabilized by the addition of one or more of a wide variety of organic compounds, which compounds may be referred to as general-purpose decomposition inhibitors or stabilizers. As between the two materials tetrachloroethylene and trichloroethylene, the stabilizing effect of the organic compounds is not different insofar as the manner of stabilizing is concerned; however, as might be expected, the degree of stabilization may be slightly different. In order to indicate the variety of materials which may be employed as general-purpose stabilizers and, in part, the scope of the present invention, it is desired to set forth compounds which are exemplary of such general-purpose stabilizers.

Accordingly, suitable materials are as follows: hydrocarbons such as pentane, hexane, heptane, octane, decane, their isomers and similar unsaturated compounds, for example, amylene and diisobutylene. Also, cyclic hydrocarbons, for example, cyclohexane, and pinene may be employed. Hydrocarbon derivatives are effective, especially those containing nitrogen, such as amines, for example, ethyl and diethylamine, triethylamine, tributylamine, hexamethylenetetraamine; amides, for example, formamide and acetamide; cyanamides, for example, dimethyl and diethylcyanamide; cyanides, for example, ethyl and propyl cyanide, and vinylcyanide; nitro compounds, for example, nitromethane, nitroethane, nitropropane and alpha-chloro derivatives of the two latter compounds; nitroso compounds, such as nitrosoethane and isoamylnitrite; oximes, for example, formaldoxime, furfuraldoxime, acetaldoxime, acetoxime, dimethylglyoxime, alpha-benzyl dioxime. Pyrrole and derivatives, such as N-methyl or N-ethyl pyrrole, 2-methyl pyrrole, 2,4-dimethyl pyrrole and 2-chloropyrrole may be used. Mercaptans, such as ethyl, n-butyl, n-heptyl, phenyl, and p-cresyl mercaptan are suitable. Alcohols, and derivatives thereof, such as amino and alkoxy alcohols may be employed; also, polyhydroxy compounds are suitable, for example, ethanol, n-butanol, n-hexanol, lauryl alcohol, 2-ethylbutanol, 2-ethylhexanol, tertiary amyl alcohol, glycerine, ethylene glycol, propylene glycol; methyl, ethyl, propyl and butyl ethers of ethylene or propylene glycols, ethanol amine, butanol amine, diethylaminoethanol and various isomers of these and similar compounds. Acetylenic carbinols are especially effective, for example, 3-methyl-1-pentyne-3-ol, 3-methyl-3-butyne-2-ol and 3,5-dimethyl-1-hexyne-3-ol. Hydroxy-aromatic compounds, for example, thymol, phenol, catechol, hydroquinone and its monoalkyl and monoaralkyl ethers, hexylresorcinol and p-tertiarybutylphenol may be used. Ethers and oxides such as ethyl and propyl ethers, ethyl Cellosolve, ethylene and propylene oxides, dioxan, glycidol and tetrahydrofurfuryl alcohol are suitable. Esters such as ethyl and propyl formates, methyl, ethyl and propyl acetates may be employed. Thiophenes such as 2-methylthiophene, 2-chlorothiophene and 2-bromothiophene are useful. Heterocyclic compounds including carbon, nitrogen and oxygen or sulfur in the ring may be employed, such as oxazoles, oxazolines, oxazolidines, isoxazoles, isoxazolines, thiazoles and thiazolines, particularly effective members of these groups being 2,4-dimethyloxazole, 2-methyl-2-oxazoline, 2,3-dimethyloxazolidine, isoxazole, 3-methylisoxazole, 3,3,5-trimethyl-4-isoxazoline, thiazole, 4-methylthiazole, 2-thiazoline, 2-methyl-2-thiazoline. Still other compounds which may be employed are tetramethylpiperazine, methyl and ethyl thiocyanate, thiocarbamide, urea, thiourea, diethylthiourea, quinoline, caffeine and pyridine. Some of these stabilizing materials are more effective than others and they vary in cost. Generally, the selection is based upon satisfactory performance at least cost.

Although some, if not all of the mentioned general-purpose stabilizers function to inhibit light-catalyzed decomposition to some extent, it is customary to add a second stabilizer for the particular purpose of surely light-stabilizing the composition. For example, it is known to add materials such as benzaldehyde and thymol. Benzaldehyde is especially effective but it has now been found to be undesirable for use in metal cleaning because it stains the metal in the contact cleaning process; for example, brass is discolored to a pinkish cast even by the small quantity of stabilizer that the composition requires. In preparing the stabilized composition, it is desirable to keep the necessary quantity of stabilizers as low as possible, consistent with the desired result. Accordingly, since the light stabilizer has been found desirable, attempts have been made to find a light stabilizer which functions as a general stabilizer whereby the necessary quantity of the general stabilizer can be reduced or perhaps eliminated. Similarly, it might be desired to enjoy the increased general stabilizing effects without reducing the quantity of general stabilizer. It is not believed that any of the known stabilizers satisfy this need. As will appear more fully herein, the present invention avoids the difficulties mentioned above.

It is now known that where the crude tetrachloroethylene, particularly that obtained from commercial processes involving the chlorinolysis of lower hydrocarbons or hydrocarbon chlorides, or the chlorination and simultaneous dehydrochlorination of hydrocarbon chlorides, such as ethylene dichloride, or of unsaturated hydrocarbons, such as acetylene, ethylene, and the like, contains appreciable amounts of lower chlorinated aliphatic hydrocarbons other than tetrachloroethylene as impurities, such crude product may initially be treated with an aqueous solution of an inorganic base and a high boiling point organic base in order to destroy the major portion of volatile acids and acid-forming impurities. According to this invention, it has been found that tetrachloroethylene so treated may be stabilized substantially permanently under extremely adverse conditions imposed by all of the several decomposing forces, and then be employed in metal degreasing, dry cleaning and other operations without encountering the problem mentioned above, notably, staining of the metals, and the objectionable odor. Additionally, use of the compositions according to this invention result in greatly improved color clarity of treated fabrics, especially those in pastel colors. The invention also enhances general stability of the composition to a marked degree over previously known compositions. Furthermore, the improved results may be enjoyed without significant cost increase. According to this invention, these results are accomplished by combining with such purified tetrachloroethylene, stabilizing amounts of any well-known general-purpose stabilizer, such as are mentioned above, especially, 2-methyl-3-butyne-2-ol and 3-methyl-1-pentyne-3-ol hereinafter referred to respectively for convenience as methyl butynol and methyl pentynol and light stabilizing amounts of a compound of the general formula:

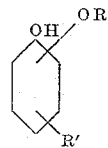

wherein R may be any of the common hydrocarbon radicals such as alkyl, alkylene, alkaryl, aralkyl cycloalkyl, particularly suitable substituents being such as, methyl, ethyl, propyl, and butyl because of their increased compatibility with the solvent and the environment of its usage. R' is an unsaturated hydrocarbon chain, for example, ethylene, propylene, butylene, butadiene, pentene, decene their isomers and the like.

In particular, isoeugenol is especially suitable because of its high stabilizing character and ready availability. Isoeugenol is more particularly described by the formula, 4-hydroxy-3-methoxy-1-propenylbenzene.

Compounds within the generic formula, and especially isoeugenol, may be employed to light-stabilize a tetrachloroethylene product containing minor amounts of impurities such as the lower aliphatic chlorohydrocarbons, particularly in the liquid phase. However, stabilization effects are found to be more pronounced where the tetrachloroethylene has been pretreated to remove or destroy the greater part of the impurities, such as hydrogen chloride, phosgene, and the chloro-acids, prior to combining it with the stabilizer.

The initial treatment of the crude tetrachloroethylene may include adding an organic base of the amine type and having a boiling point substantially higher than tetrachloroethylene, for example, aniline in an amount from approximately 0.2–2.0% by weight to the crude product, and fractionally distilling the crude mass to recover substantially all of the tetrachloroethylene as an intermediate fraction in the distillation; additional treatments may include washing the tetrachloroethylene fraction with a solution of an inorganic base, such as an alkali metal or alkaline earth metal base, for example, sodium hydroxide, sodium carbonate, calcium hydroxide, magnesium bicarbonate, and the like, drying the washed product and distilling the dried product to recover a more highly refined tetrachloroethylene fraction. The purpose in using an amine, such as aniline, is to allow for the reaction of such amine with acid chloride products contained in the crude product, whereby an anilide or analogous compound may form during distillation and the undesired impurity is retained in the distillation residue. The purpose of washing the effluent from the initial distillation with an alkali metal or alkaline earth metal base is to remove the more volatile of the acid chloride impurities, such as hydrogen chloride, phosgene, and the like, which may not have reacted with the amine.

The crude product may also be washed initially with a solution of an inorganic base, such as those noted above, dried, and combined with an amine having a boiling point substantially higher than tetrachloroethylene, generally in an amount from 0.2-2.0% by weight, and the mixture thus obtained distilled as decribed above in order to recover the purified tetrachloroethylene substantially free from chloro-oxygen-containing impurities.

Where such impurities as hydrogen chloride, phosgene, chloro-acids and the like, are known to be extremely low in the crude product, this material may be combined with an amine such as aniline, as noted hereinabove, and subjected to fractional distillation to recover the substantially pure tetrachloroethylene without the necessity of resorting to the treatment with a solution of an inorganic base. Moreover, the dilute alkaline wash may be omitted even where the chloro-oxygen-containing compounds are present in appreciable quantities in the crude product, but it has been found that the amount of organic amine consumed and the volume of distillation residue accumulated are excessive.

The beneficial effects of the present invention may also be realized where tetrachloroethylene has been purified in a commercial operation and stabilized either with a high boiling point stabilizer, i.e., a stabilizer such as one of the amine or of the ether type having a higher boiling point than that of tetrachloroethylene, or with stabilizers which are more volatile than tetrachloroethylene, by removing such stabilizer as by chemical reaction, azeotropic distillation, or the like; the thus-treated mass is then fractionally distilled to recover the tetrachloroethylene fraction, which may be combined with a particularly selected one of the general-purpose stabilizers and a light-stabilizer, as noted hereinabove in amounts sufficient to effect stabilization, whereby the tetrachloroethylene is rendered especially suitable, due to its stability, for degreasing or dry cleaning operations.

After any one of the above-described initial treatments, the recovered tetrachloroethylene may be combined with a stabilizing amount of any of the known general-purpose stabilizers, e.g., preferably a hydroxy alkyne such as methyl pentynol, and a light-stabilizing amount of a light-stabilizer of the general formula set out above, for example, from about 0.001-0.1% by weight of tetrachloroethylene, preferably, however, from about 0.005-0.02%. Amounts as high as 0.1%, or even higher are contemplated where the quantity of impurities is known to be high, as where an unpurified tetrachloroethylene product is employed or where the stabilized product will be employed in unusually adverse circumstances. Conversely, amounts as low as 0.001% are contemplated for use where the stabilized product will be exposed to light of low intensity or for a short time only. Generally, however, tetrachloroethylene pretreated for impurity reduction as explained herein may be stabilized for its more important uses by about 0.01% of light-stabilizer. The general-purpose stabilizer with which the light stabilizes may be combined in the solvent is employed in its usually effective quantity, for example, about 0.1% to about 1% by weight of the solvent; usually, however, about 0.25% by weight.

In the examples to be set forth hereinafter, reference will be made to stability tests to which the exemplary compositions are subjected. In order to avoid needless repetition in the several examples, these tests are now explained in detail and are referenced to this explanation in a general way in the examples:

One hundred mls. of the tetrachloroethylene to be tested for stability are placed in a 300-ml. flask equipped with a ground glass joint. A copper strip 2.0 x 7.5 x 0.005 cm., which has been washed with concentrated hydrochloric acid, water, dried and weighed, is placed in the flask. Next, 0.2 ml. of water is added. The flask is attached to a small Soxhlet extractor equipped with a bottom ground glass joint and a top ground glass joint. A bulb type condenser with a bottom ground glass joint is attached to the Soxhlet. An acid washed, weighed copper strip (2.0 x 7.5 x 0.005 cm.) is placed in the Soxhlet, and another acid washed and weighed copper strip of the same size is placed in the bottom part of the condenser, so that the condensing tetrachloroethylene condenses on the strip. The water scrubber (containing 150-200 mls. $H_2O$) absorbs any HCl that does not react with the copper during the stability run. To prevent the sucking back of water, two filter flasks, so arranged that water is pushed from one flask to the other with changes in pressure, are employed. The flask containing the tetrachloroethylene is heated on a heater controlled to adjust the boiling rate so that the Soxhlet extractor empties every 8-10 minutes. A 100-watt bulb is placed one inch from the vapor line of the Soxhlet extractor to furnish light for the photochemical oxidation. The stability test is run for 72 hours.

The aggregate loss in weight of the copper strips is a measure of the stability of the tetrachloroethylene tested. This test may suitably be termed a general stability test for examining the effectiveness of the general-purpose stabilizer alone and when combined with the light stabilizers of the invention.

In general, material which shows a 45 mg. aggregate loss in weight in the 3 copper strips over the period of the test is acceptable for dry cleaning purposes. (National Institute of Cleaning and Dyeing, Perchlorethylene (Drycleaning), Tentative Standard 3-50.) 18 mg. loss is closer to industry standards, however, but naturally the more stable the material, the better. According to this invention, losses as low as 2 mg. may be maintained.

In order to determine resistance of the compositions to decomposition by prolonged exposure to light, the composition to be examined is exposed to incandescent light of 200 watts at a distance of three and one-half inches. Acidity, as hydrochloric acid, is determined at intervals by extracting a sample of the composition with distilled water and titrating with 0.01 N sodium hydroxide.

In order that those skilled in the arts may better understand the present invention and in what manner the same may be carried into effect, the following specific examples are offered:

*Example I*

In order to verify the non-staining property of the materials of this invention, the material under test is heated to boiling and freshly buffed polished brass strips are exposed to liquid and vapor phase contact therewith. More particularly, a sample of solvent is selected and divided into three equal portions. Into the first portion, which contains no stabilizing additives, is introduced a polished brass strip, a portion of the strip being above the surface of the liquid and thus exposed to the vapors of the solvent, and a portion being beneath the surface where it is contacted by the liquid. To the second portion is added 0.01% by weight of benzaldehyde and the brass strip is supplied as in the first portion. To the third portion is added 1% isoeugenol and the brass strip is supplied as in the case of the first two portions. All three portions are boiled for one and one-half hours and then the strips are examined. In the case of the first portion containing no additive, no permanent staining is observed. The strip employed in the second portion is found to be permanently stained both above and below the liquid level and the stain can not be removed by wiping action indicating that damaging effects are to be expected whether the material is used in the liquid or vapor phase. However, the strip which is employed in the third portion is found to be unstained and comparable to the strip employed in the first portion, thus conclusively demonstrating the improvement to be had by the use of the additive of this invention.

*Example II*

A sample of tetrachloroethylene known to contain impurities is refluxed with an equal volume of 5% caustic soda for about 5 hours. The solvent is then separated, dried over calcium chloride and fractionated, removing about 10% by volume of the light ends contained in the solvent. The tetrachloroethylene fraction is divided into three equal parts. The first part is stabilized with 0.25% by weight 1-nitropropane; the second part is stabilized with 0.25% by weight 1-nitropropane and 0.01% by weight thymol; the third part is stabilized with 0.25% by weight 1-nitropropane and 0.01% by weight isoeugenol. The three portions are subjected simultaneously to the general stability tests described above for determing weight loss with the following results:

| Sample | Stabilizer System | Loss in Weight (Mg) of Copper Foil Strips (3) |
|---|---|---|
| No. 1 | 1-nitropropane | 38.0 |
| No. 2 | 1-nitropropane and thymol | 33.3 |
| No. 3 | 1-nitropropane and isoeugenol | 26.0 |

A control sample of the untreated unstabilized tetrachloroethylene shows a total weight loss of 49.3 mg. It will be noted that the overall result insofar as acceptability of the stabilized tetrachloroethylene for use in commerce is concerned is not expectionally good, since a 26 mg. weight loss in the copper strip during the test is perhaps higher than might be desired; however, this fact is not important in the example since it is easily correctable and the example is provided to give comparative results between the several stabilized samples. The comparative results are significant and they indicate the superiority of the isoeugenol stabilized sample. The overall poor result is generally found where a highly impure solvent is treated initially in accordance with procedure adapted for treating a solvent containing only a minor quantity of impurities, such as are customarily afforded by a relatively freshly prepared crude solvent. For example, it may be mentioned that relatively pure tetrachloroethylene is stabilized with a general stabilizer, specifically about 0.25% by weight methyl pentynol, and 0.01% by weight isoeugenol and tested in accordance with the general stability test procedure with a total weight loss of about 8.3 mg. or lower. Of course, methyl pentynol and similar acetylinic carbinols are exceptionally effective general-purpose stabilizers, methyl pentynol alone in quantity of about 0.25% by weight reducing the loss in weight in an identical test conducted concurrently upon the same stock to about 9.3 mg.

*Example III*

A sample of tetrachloroethylene from current production is treated initially for purposes of purification as in Example II in order to obtain a fraction of tetrachloroethylene for examination. The tetrachloroethylene fraction so obtained is divided into parts and stabilized as follows: the first first part is stabilized with 0.25% by weight 1-nitropropane and 0.01% by weight benzaldehyde; the second part is stabilized with 0.25% by weight methyl pentynol; the third portion is stabilized with 0.25% by weight methyl pentynol and 0.01% by weight isoeugenol; a fourth part is stabilized with 0.25% by weight methyl pentynol and 0.01% by weight benzaldehyde. The samples are subjected simultaneously to the general stability test, as described above, for the purpose of determining weight loss in the copper strips with the following results:

| Sample | Stabilizer System | Loss in Weight (Mg) of Copper Foil Strips (3) |
|---|---|---|
| No. 1 | 1-nitropropane and benzaldehyde | 15.7 |
| No. 2 | methyl pentynol | 8.4 |
| No. 3 | methyl pentynol and isoeugenol | 6.3 |
| No. 4 | methyl pentynol and benzaldehyde | 7.5 |

*Example IV*

A batch of freshly prepared tetrachloroethylene is treated in accordance with the procedure of Example II for reduction of impurities and the fraction so obtained is divided into parts and stabilized as follows: the first part is stabilized with 0.25% by weight 1-nitropropane and 0.01% by weight benzaldehyde; the second part is stabilized with 0.25% methyl pentynol and 0.01% isoeugenol; the third part is stabilized with 0.25% by weight methyl butynol and 0.01% by weight isoeugenol and a fourth part is stabilized with 0.25% by weight dimethyl hexynol and 0.01% by weight isoeugenol. The samples are subjected simultaneously to the general stability tests described above for the determination for the loss in weight of the copper strips with the following results:

| Sample | Stabilizer System | Loss in Weight (Mg) of Copper Foil Strips (3) |
|---|---|---|
| No. 1 | 1-nitropropane and benzaldehyde | 13.3 |
| No. 2 | methyl pentynol and isoeugenol | 3.7 |
| No. 3 | methyl butynol and isoeugenol | 3.8 |
| No. 4 | dimethyl hexynol and isoeugenol | 4.7 |

*Example V*

A tetrachloroethylene fraction from current production is treated initially for purification in accordance with the procedure described in Example II. The fraction so obtained is divided into parts and stabilized as follows: to the first part are added 0.25% by weight 1-nitropropane and 0.01% by weight benzaldehyde; the second part is stabilized with 0.25% by weight 1-nitropropane; and the third part is stabilized with 0.25% by weight 1-nitropropane and 0.01% by weight isoeugenol. The three samples are subjected simultaneously to the light stability tests described above for measuring the increase in acidity of the samples under the influence of light with the following results:

| Sample | Stabilizer | Acidity H₂O Extract (Mls. 0.01N NaOH) | |
|---|---|---|---|
| | | After 10 days | After 21 days |
| No. 1 | 1-nitropropane and benzaldehyde | 1.6 | 3.0 |
| No. 2 | 1-nitropropane | 22.6 | (¹) |
| No. 3 | 1-nitropropane and isoeugenol | 0.5 | 2.2 |

¹ More than 100 mls.

In addition to the advantages that are realized by the use of compositions prepared according to this invention, as indicated by the examples set forth above, it can be said also that the new stabilized compositions do not create new problems, but, rather, provides still other advantages. To indicate these, it may be mentioned that the compositions of this invention may be employed to excellent advantage with practically all synthetic dry cleaning detergents. Solvents that are stabilized in accordance with this invention show a marked reduced tendency to foaming. Additionally, the new compositions have an improved resistance to the detrimental effects of water, that is to say, the stabilizer system is not deactivated in the presence of water as is the case in connection with some known solvent compositions. Equipment, such as dry cleaning equipment, may be employed for much longer lengths of time without cleaning or replacements due to the reduction in corrosion. In the cleaning of fabrics, particularly, fabrics in pastel shades, there is a definite increase in the brightness of color; not only are the colors brighter, but actual cleaning appears to be improved as is indicated by the fact that very little wet cleaning and spot cleaning of garments is necessary after having been cleaned with the new solvent composition.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter comprising tetrachloroethylene and, as a general-purpose stabilizer, from about 0.1 to about 1% by weight of a hydroxy alkyne, and, as a light stabilizer, from about 0.001% to about 0.1% by weight isoeugenol.

2. A composition of matter comprising tetrachloroethylene, about 0.25% by weight of methyl pentynol, and about 0.01% by weight isoeugenol.

3. A composition of matter comprising tetrachloroethylene and, as an all-purpose stabilizer, from about 0.1 to about 1% by weight of methyl pentynol and as a light stabilizer from about 0.001% to about 0.1% by weight of isoeugenol.

References Cited in the file of this patent

UNITED STATES PATENTS

| | | |
|---|---|---|
| 2,008,680 | Carlisle et al. | July 23, 1935 |
| 2,136,333 | Coleman et al. | Nov. 8, 1938 |
| 2,155,723 | Levine et al. | Apr. 25, 1939 |
| 2,181,102 | Stoesser et al. | Nov. 21, 1939 |
| 2,319,261 | Pitman | May 18, 1943 |